US006875329B2

(12) United States Patent
Washizu et al.

(10) Patent No.: US 6,875,329 B2
(45) Date of Patent: Apr. 5, 2005

(54) METHOD FOR SEPARATING SUBSTANCES USING A DIELECTROPHORETIC APPARATUS

(75) Inventors: Masao Washizu, Kyoto-Fu (JP); Tomohisa Kawabata, Amagasaki (JP)

(73) Assignee: Wako Pure Chemical Industries, Ltd., Osaka (JP)

( * ) Notice: Subject to any disclaimer, the term of this patent is extended or adjusted under 35 U.S.C. 154(b) by 276 days.

(21) Appl. No.: 09/833,566

(22) Filed: Apr. 13, 2001

(65) Prior Publication Data

US 2001/0047941 A1 Dec. 6, 2001

(30) Foreign Application Priority Data

Apr. 13, 2000 (JP) ....................................... 2000-112337
Dec. 8, 2000 (JP) ....................................... 2000-374210

(51) Int. Cl.[7] ............................................. G01N 27/447
(52) U.S. Cl. ....................................... 204/547; 204/643
(58) Field of Search ................................ 204/450, 547, 204/600, 643

(56) References Cited

U.S. PATENT DOCUMENTS 5,814,200 A * 9/1998 Pethig et al. ............... 204/547
5,948,328 A * 9/1999 Fiedler et al. ................. 264/5
5,993,631 A * 11/1999 Parton et al. ............... 204/547
6,149,789 A * 11/2000 Benecke et al. ............ 204/547

* cited by examiner

*Primary Examiner*—Kaj K. Olsen
(74) *Attorney, Agent, or Firm*—Armstrong, Kratz, Quintos, Hanson & Brooks, LLP

(57) ABSTRACT

To provide An electrode for a dielectrophoretic apparatus in which a background detected by reflecting an excited light on an electrode present under the substance (molecule) is reduced and an S/N ratio is enhanced. Also, there is provided an dielectrophoretic apparatus, in an apparatus in which a liquid containing substances to be separated is present in a non-uniform electric field formed by a dielectrophoretic electrode, and separation is carried out by a dielectrophoretic force exerting on the substances, wherein the collecting ability of substances is enhanced. The present invention is characterized in that a vacant space is provided in an electrode whereby substances subjected to influence by a negative dielectrophoretic force can be concentrated in said vacant space of an electrode, or above or below portion of the space.

21 Claims, 21 Drawing Sheets

(A)

(B)

(A)

(B)

(A)

(B)

(A)

(B)

METHOD FOR SEPARATING SUBSTANCES USING A DIELECTROPHORETIC APPARATUS

BACKGROUND OF THE INVENTION

This invention relates to an electrode for a dielectophoretic apparatus, in which a background can be reduced to enhance an S/N (Signal/Noise) ratio in detecting a substance to be measured (molecules to be measured) by a fluorescent strength or the like, a method for manufacturing the same, an electrode constitution provided with the electrode, and a method for separating substances using the electrode.

This invention further relates to an dielectrophoretic apparatus having an enhanced collecting ability, a method for manufacturing the same, and a method for separating substances using the apparatus.

Processing technology of materials at scales of nanometer to micrometer by means of micromachining technology such as photolithography has recently been established by development of semiconductor technologies and it has still continued its progress at present.

In the fields of chemistry and biochemistry, new technology called a Micro Total Analysis System ($\mu$-TAS), Laboratory on a chip is growing, in which such micromachining technology is employed to carry out a whole series of chemical/biochemical analytical steps of extraction of component(s) to be analyzed from biological samples (extraction step), analysis of the component(s) with chemical/biochemical reaction(s) (analysis step), and subsequent separation (separation step) and detection (detection step) using a highly small analytical device integrated on a chip having each side of a few centimeters to a few ten centimeters in length.

Procedures of the $\mu$-TAS are expected to make a large contribution to saving the analyzing time, reducing the amounts of samples to be used and reagents for chemical/biochemical reactions, and reducing the size of analytical instruments and the space for analysis in the course of all the chemical/biochemical analytical steps.

For the separation step in $\mu$-TAS, in particular, there have been developed capillary electrophoretic methods in which a capillary (fine tube) with an inner diameter of less than 1 mm which is made of Teflon, silica, or the like as material is used as the separating column to achieve separation with charge differences of substances under a high electric field, and capillary column chromatographic methods in which a similar capillary is used to achieve separation utilizing the difference of the interaction between carrier in the column medium and substances.

However, capillary electrophoretic methods need a high voltage for separation and have a problem of a low sensitivity of detection due to a limited capillary volume in the detection area and also these is found such a problem that they are not suitable for separation of high molecular weight substances, though suitable for separation of low molecular weight substances, since the length of capillary for separation is limited on the capillary column on a chip and thus a capillary can not be made into a length enough for separating high molecular weight substances. In addition, in capillary column chromatographic methods there is a limit in making the throughput of separation processing higher and also there is such a problem that reducing the processing time is difficult.

Thus, attention has recently been paid to a method for solving the problems as described above, which comprises utilizing such a phenomenon so-called dielectrophoretic force that a positive and negative polarization occurs in substances placed under a non-uniform electric field , thereby providing a driving force of moving the substances [H. A. Pohl, "Dielectrophoresis", Cambridge Univ. Press (1978); T. B. Jones, "Electromechanics of Particles", Cambridge Univ. Press (1995), and the like].

These separation methods are presently believed to be the suitable separation method in ($\mu$TAS from the following points: (1) a rapid separation can be expected at a low applied voltage without requiring a high voltage as in capillary electrophoresis, since an electric field and its gradient can be increased to an extreme extent if micromachined electrodes are employed, because the degree of dielectrophoretic forces depends on the size and dielectric properties of substances (particles) and is proportional to the electric field gradient; (2) an increase in temperature due to applying the electric field can be minimized, since a strong electric field area is localized at a significantly small region, and a high electric field can be formed; (3) as the dielectrophoretic force is a force proportional to the electric field gradient, the force is understood as independent on the polarity of the applied voltage, and thus works under an AC electric field in a similar way to a D.C. electric field, and therefore if a high frequency A.C is employed, an electrode reaction (electrolytic reaction) in an aqueous solution can be suppressed, so that the electrodes themselves can be integrated in the channel (sample flow path); (4) improvement in a detection sensitivity can be expected, since there is no restriction to a chamber volume of the detection component unlike the capillary electrophoresis, and the like.

The dielectrophoresis termed herein is a phenomenon in which neutral particles move within non-uniform electric field, and the force exerting on molecules is called a dielectrophoretic force. The dielectrophoretic force is divided into two forces, i.e., a positive dielectrophoretic force in which substances move toward a high electric field, and a negative dielectrophoretic force in which substances move toward a low electric field.

(General Equation of Dielectrophoretic Forces)

The equivalent dipole moment method is a procedure of analyzing dielectrophoretic forces by substituting induced charges for an equivalent electric dipole. According to this method, the dielectrophoretic force $F_d$ acted upon a spherical particle with a radius of a which is placed in an electric field E is given by:

$$F_d=2\pi a^3\epsilon_m Re[K^*(\omega)]\nabla(E^2) \tag{1}$$

wherein $K^*(\omega)$ means by using an angular frequency of the applied voltage $\omega$ and the imaginary unit j as follows:

$$K^*(\omega)=\epsilon_p^*-\epsilon_m^*/\epsilon_p^*+2\epsilon_m^* \tag{2}$$

$$\epsilon_p^*=\epsilon_p-j\sigma_p/\omega,\ \epsilon_m^*=\epsilon_m-j\sigma_m/\omega \tag{3}$$

wherein $\epsilon_p$, $\epsilon_m$, $\sigma_p$, and $\sigma_m$ are permittivity and conductivity of the particle and the solution, and complex quantities are designated by *.

Equation (1) indicates that in a case of $Re[K^*(\omega)]>0$, the force works in such a way as attracting the particle toward a strong electric field side (positive dielectrophoretic, positive DEP), and in a case of $Re[K^*(\omega)]<0$, the force works in such a way as pushing the particle toward a weak electric field side (negative dielectrophoretic, negative DEP).

As will be apparent from the above-described Equations, whether the positive electrophoresis occurs in a certain substance or the negative electrophoresis occurs therein is decided by the interaction of three parameters, i.e., 1) frequency of an electric field applied, 2) conductivity and permittivity (dielectric constant) of medium, and 3) conductivity and permittivity (dielectric constant) of substance.

When these parameters are changed, even the same substance shows a positive dielectrophoresis or a negative dielectrophoresis. The negative dielectrophoresis is a phenomenon in which the substance moves toward a low electric field which is weak in density of electric flux line while the positive dielectrophoresis moves toward a high electric field which is high in density of electric flux line. FIG. 1 is a view for explaining the negative dielectrophoresis. The negative dielectrophoretic force is a force for carrying substances to such a field as to be lowered where the density of electric flux line received by the substance.

Sometimes, the substances are measured by concentrating them in an area where an electric field on an electrode is weak by using the negative dielectrophoresis as described and thereafter measuring them by fluorescent strength or the like The detection of the fluorescent strength is carried out by irradiating an excitation light on the substance to be measured to observe fluorescent light from the upper surface of the electrode.

At that time, where a conventional electrode is used, there poses a problem that the excitation light is reflected even on the electrode which is present under the substance to be measured, and thus reflected light is detected as a great background. This leads to a problem of reducing the measurement sensitivity. Besides, where a conventional electrode is used, since light does not permeate through the electrode, the substances concentrated (gathered) on the electrode cannot be detected by absorbance.

Further, the dielectrophoresis is contemplated to be a separation method suitable for $\mu$-TAS. However, In consideration of a case of application of the dielectrophoresis to $\mu$-TAS, it is extremely important to enhance the collecting ability. In this respect, the conventional dielectrophoretic apparatus should not yet be satisfied.

That is, if the collecting ability of substances is enhanced, separation becomes enabled in the electrode region, and the substances are held efficiently, whereby separation with high S/N (Signal/Noise) ratio is realized. Further, for example, particularly, in the Field-Flow fractionation for carrying out separation by the interaction of the dielectrophoretic force and the fluid drag exerting on the substances, separation in a short electrode region can be made even at the same flow velocity.

SUMMARY OF THE INVENTION

[Invention 1]

It is an object of the present invention to provide an electrode for a dielectrophoretic apparatus which reduces a background in which an excitation light is reflected on an electrode which is present under a substance (a molecule) and detected to enhance an S/N ratio.

It is a further object of the present invention to provide an electrode for a dielectrophoretic apparatus, which can be detected even by absorbance.

It is another object of the present invention to provide a method for separating substances and a detection method using the above electrode.

For achieving the aforementioned objects, the present inventors have studied earnestly, as a result of which the inventors have thought out that an electrode in an area where substances to be measured are concentrated (gathered) is removed to thereby enable reduction in background caused by reflection of an excitation light from the electrode.

In the past, there are many patents and articles in connection with apparatus and method in a dielectrophoretic chromatography apparatus (Field-Flow fractionation), but a dielectrophoretic apparatus and method which reduces a background by removing an electrode including an area where substances to be measured are concentrated to enhance an S/N ratio are not known at all, and such an idea is not known at all.

The present invention is characterized in that by forming a vacant space in an electrode, substances subjected to influence by a negative dielectrophoretic force generated by application of voltage to the electrode are concentrated in the vacant space of the electrode, or above or below position of the space.

The vacant space is formed from a hollow space or formed of a material which does not substantially reflect excitation light or permeates light to such an extent as capable of measuring the absorbance. However, the vacant space is preferably a hollow space.

The space where substances subjected to influence by the negative dielectrophoretic force are concentrated is a space in which the density of electric flux line is low for the substances.

Further, through all the substances subjected to influence by the negative dielectrophoretic force are preferably concentrated in the vacant space, concentrated substances in the vacant space may be a part of all the substances.

The electrode constitution of the present invention is characterized by comprising an electrode, and a lid provided thereabove so as to form a gap between the lid and said electrode surface, the electrode being formed as in the electrode of the present invention provided with the vacant space.

The electrode constitution of the present invention includes an electrode of the present invention, a substrate (an electrode base plate) and a lid. In the dielectrophoretic apparatus, a device for applying a voltage to an electrode and a detection section are added to the electrode or the electrode constitution.

A method for manufacturing an electrode according to the present invention characterized in that said vacant space is formed by physical or chemical means.

The separation method and detection method according to the present invention are characterized in that using the electrode of the present invention provided with the vacant space, a liquid including substances subjected to influence by the negative dielectrophoretic force generated by application of voltage to the electrode is positioned in the electrode or the vacant space or in the vicinity thereof, or causes to flow thereabove or therebelow, whereby substances subjected to influence by the negative dielectrophoretic force are concentrated (gathered) in the vacant space, or above or below position of the space.

The separation method of the present invention can be used for liquids in which two kinds or more of substances are dissolved or suspended, but preferably, the substances subjected to influence by the negative dielectrophoresis force concentrated in the vacant space or in a vertical direction thereof are granular substances. Because, in the granular substances, an area in which the density of electric flux line is low and the granular substances are concentrated tends to be the vacant space or in a vertical direction thereof.

The vacant space of the present invention, should be formed in such a way that an area in which the density of a electric flux line is low and the granular substances are concentrated may be formed in the vacant space or in a vertical direction thereof by changing the size of the substances subjected to influence by the negative dielectrophoresis force, and the width and depth of an electrode used (the height from the electrode surface to the lid part and or the height from the vessel bottom to the electrode surface) and frequently applied.

However, particularly, where the substances to be measured are dissolved, for example, in liquid such as water, preferably, the substances subjected to influence by the negative dielectrophoresis force are bound to the substances to be measured in a sample through "substances binding to the substances to be measured" to form a complex, and a reaction substance including the complex is applied to the dielectrophoresis.

It is noted that the substances to be measured used in the present invention means substances (molecules) to be concentrated in the area in which the density of electric flux line is low, and need not always be an object for measurement.

[Invention 2]

It is a further object of the present invention to provide, in an apparatus for enhancing the collecting ability of substances in which a liquid containing substances to be separated is present within a non-uniform electric field formed by a dielectrophoretic electrode to separate the substances by the dielectrophoretic force exerting on the substrate.

For achieving the aforementioned objects, the present inventors have studied earnestly, as a result of which the inventors have thought out that a base plate (substrate) of among electrodes are excavated to form a part lower than the electrode level whereby the non-uniform electric field region is increased and the drag of fluid is reduced to enhance the collecting ability.

In the past, there are many patents and articles in connection with separation apparatus and method making use of a dielectrophoretic force, particularly, apparatus and method in Field-Flow fractionation, but an apparatus and method which enhances the collecting ability by forming "a lower level place than an electrode level" are not known at all, and such an idea is not known at all.

Preferably, the present invention provides a dielectrophoretic apparatus having an electrode provided on a substrate, wherein means for realizing an increase of an non-uniform electric field region is formed among the electrodes.

The means for realizing an increase of a non-uniform electric field region is characterized in that a lower level places than the electrode level is formed among the electrodes. The "lower level place than the electrode level" is formed whereby electric fields are formed not only above between the electrodes but below thus increasing a non-uniform electric field region, and further, where for example, Field Flow fractionation is used, since the flow velocity of fluid in that places drops, the fluid drag is reduced to enhance the collecting ability of substances.

For forming "lower level places than electrodes level", a base plate (substrate) may be excavated between electrodes by physical and/or chemical means to form the lower level place than the electrode level among the electrodes. The physical means termed herein is, for example, a method for excavation using a suitable knife or the like, for example, an LIGA (Lithographile Galvanoformung Abformung) method using synchrotron radiant light. Further, the chemical means is etching for excavating a base plate using an etching liquid for a base plate. Further, for example a base plate can be excavated by etching using plasma of a reaction gas [Reactive ion etching (RIE)] formed by a high frequency power supply, in which a physical excavation and chemical excavation are conducted at the same time. It is noted that the means as described above may be suitably combined to carry out excavation of a base plate.

Further, a separation method according to the present invention is a separation method for substances in which a liquid containing substances to be separated is present within a non-uniform electric field formed by the dielectrophoretic electrode, and separation is carried out due to a difference in a dielectrophoretic force exerting on the substances characterized in that an increase of a non-uniform electric field region is realized by lower level places than electrode level formed between (or among) electrodes, to thereby enhance the collecting ability.

Dielectrophoresis (DEP) termed herein is a phenomenon in which a neutral particle moves within a non-uniform electric field by interaction of conductivity and dielectric constant of substances, conductivity and dielectric constant of media, and frequency applied, and a force acting on the particle is called a dielectropherotic force. The dielectrophoretic force is divided into two kinds, i.e., a positive dielectrophoretic force in which substances move toward a high electric field, and a negative dielectrophoretic force in which substances move toward a low electric field.

In the following, a case where a positive dielectrophoretic force exerts on a molecule will be described.

Namely, as shown in FIG. 2, a neutral molecule placed in an electric field has a positively induced polarization charge +q downstream in the electric field and a negatively induced polarization charge −q upstream in the electric field, respectively, thus +q receives a force of +qE from the electric field E and this portion is pulled upstream in the electric field. If the molecule is neutral, +q and −q have an equal absolute value, and if the electric field is uniform regardless of the positions, both received forces are balanced, therefore the molecule does not move. However, in the case where the electric field is non-uniform, an attractive force toward a strong electric field becomes larger, thus the molecule is driven toward the strong side of the electric field.

As described above, the molecule in a solution variously moves within an electric field according to the dielectrophoretic force generated in the molecule. However, for example, in the Field-Flow fractionation, the movement of molecules is governed by three factors: the dielectrophoretic force $F_d$, the force $F_v$ generated by the drag due to the flow in the flow path, and the force $F_{th}$ due to the thermal movement ① in the case of $F_d >> F_v + F_{th}$, molecules are captured (trapped) on the electrode, ② in the case of $F_d << F_v + F_{th}$, molecules are eluted out with flow in the flow path, regardless of the electric field. ③ in the case of $F_d \approx F_v + F_{th}$, molecules are carried downwards with repeating adsorption and desorption on the electrode, so that the molecules arrive at the outlet with delay, relative to the set flow in the flow path.

In the present invention, since a portion between electrodes is excavated deeply whereby a non-uniform electric field is formed below between the electrodes, the non-uniform electric field region is increased and the flow of fluid in that portion becomes slow to reduce the drag force Fv of fluid, whereby Fd becomes further great under the condition ① as described above and Fv becomes further small thus enhancing the collecting rate. Further, the particles trapped in the electric field formed below between electrodes are hard to flow out since the particles are positioned at "lower level places than electrode level".

The above and other objects and advantages of the invention will become more apparent from the following description.

DETAILED DESCRIPTION OF THE PREFERRED EMBODIMENTS

The preferred embodiments of the present invention will be described hereinafter.

First, the invention 1 will be described in detail hereinafter.

Figure 1:
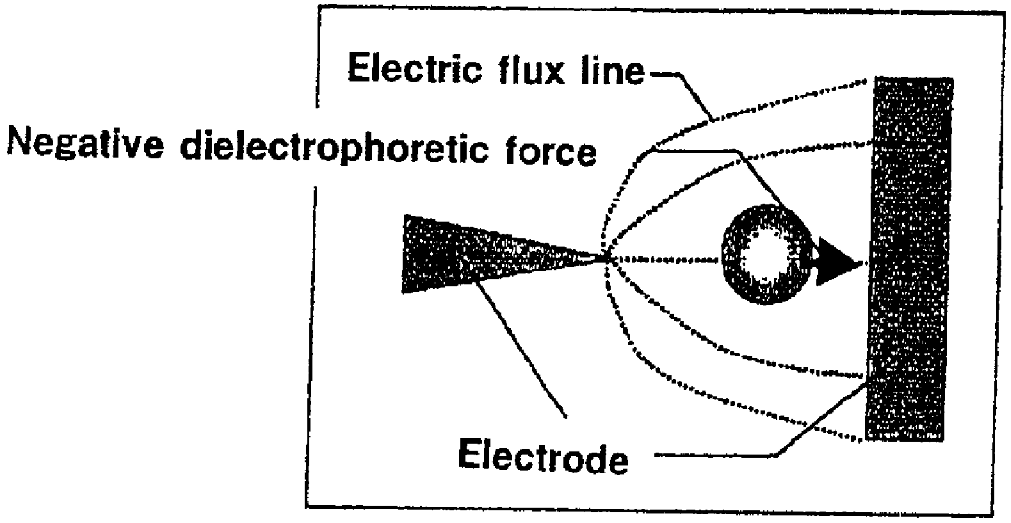
FIG. 1 is an explanatory view of the negative dielectrophoresis.
Figure 2:
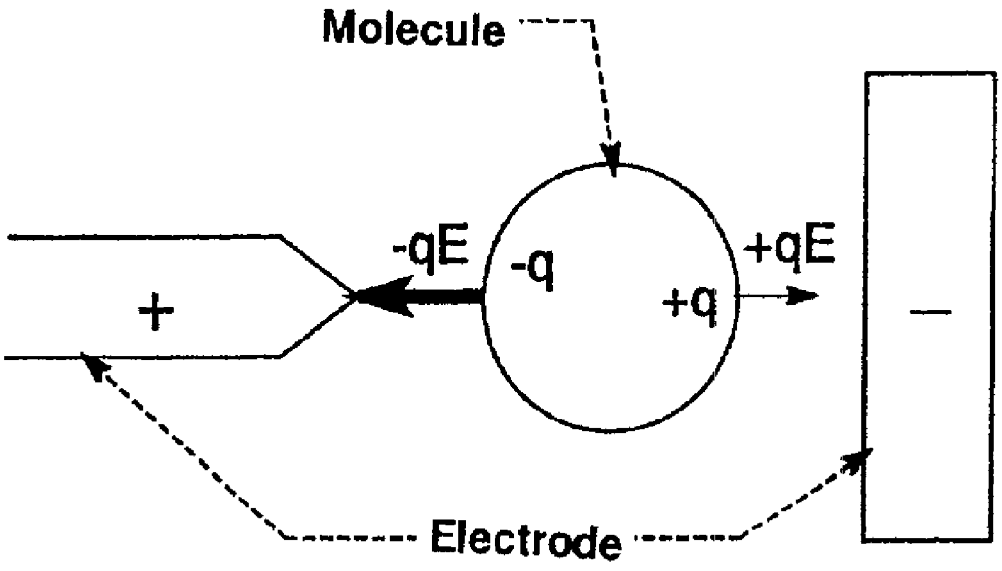
FIG. 2 is a view showing the principle of the positive dielectrophoresis.
Figure 3:
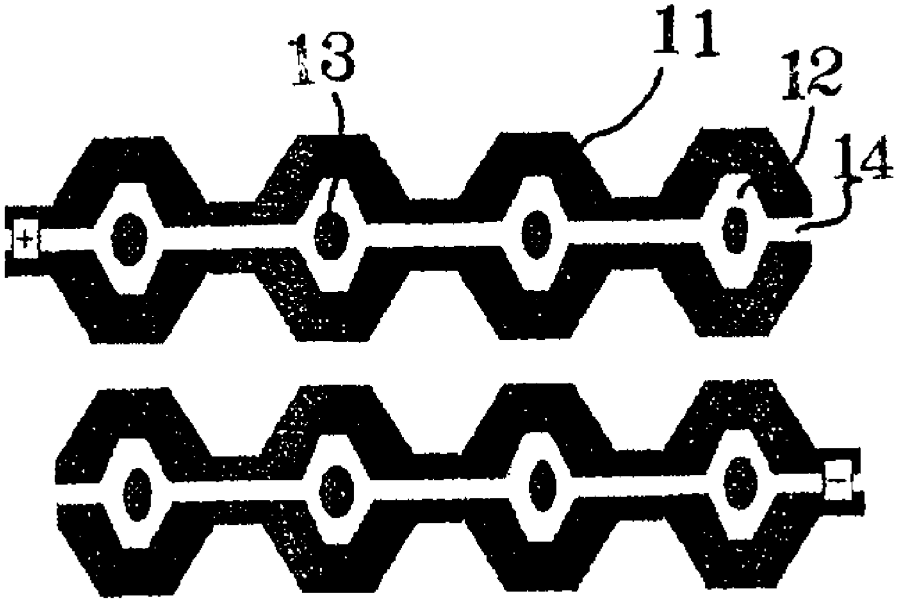
FIG. 3 is a plan view showing an embodiment of an electrode of the present invention.

FIG. 3 is a plan view showing an embodiment of an electrode for the dielectrophoretic apparatus of the present invention, showing an example in which a hollow space (a vacant space) 12 is formed in a part 13 on which are concentrated substances (substances to be measured) subjected to influence by the negative dielectrophoretic force generated by an electrode 11 having many hexagonal portions associated.

Figure 4:
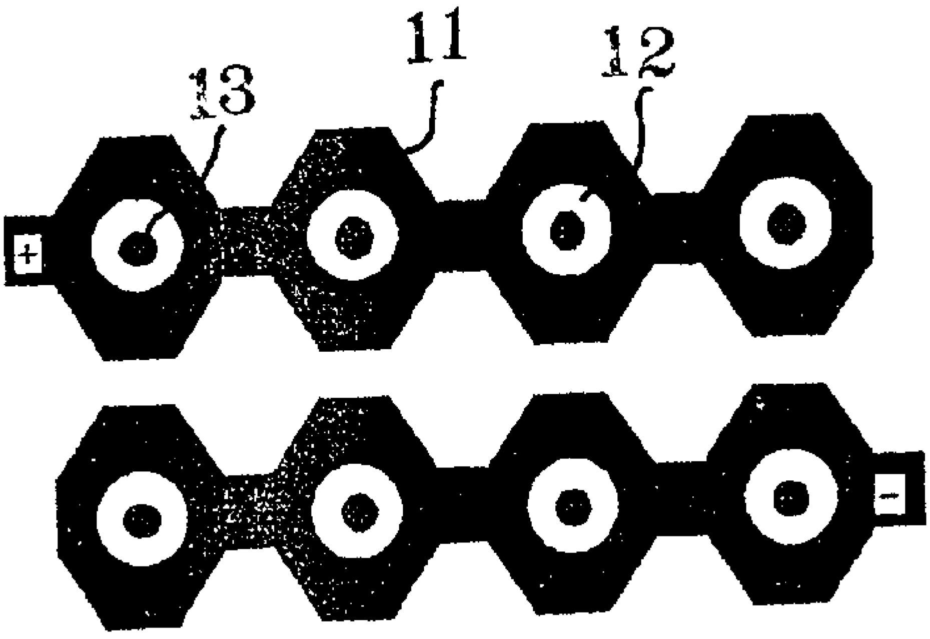
FIG. 4 is a plan view showing a further embodiment of an electrode of the present invention.

The hollow space 12 is formed so as to form an area which is low in density of electric flux line in which the substances to be measured may be concentrated in the hollow space 12 or in a vertical direction thereof. The area which is low in density of electric flux line is an area which is lower in density of electric flux line than that of an electrode in the circumference, and in general, an area which is lowest in density of electric flux line. The size of the hollow space 12 is different depending on the kind and size of substances to be measured, the distance between an electrode base plate and a cover glass (depth) or the like, but is generally formed to be larger than a space 13 on which are concentrated the substances to be measured when the hollow space is not formed. The hollow space 12 may be communicated as shown in FIG. 3 or may be independent every hexagonal portion as shown in FIG. 4.

In the hollow space 12, all the circumference may be surrounded by the electrode or a break 14 may be present in a part as shown in FIG. 3, but preferably, all the circumference may be surrounded by the electrode.

When all the circumference of the vacant space is surrounded by the electrode, electric flux lines are generated from the circumference of the vacant space, and therefore, the vacant space is to be surrounded by a high electric field region so that the substances tend to be concentrated on a specific portion and may be collected easily.

On the other hand, where a space of the vacant space is not surrounded by the electrode, no line of electric force is generated from that portion, and therefore, a portion which is not a high electric field region is generated, and the substances may be easily moved through that portion. Therefore, there is a case where the intended substance is hard to be collected.

As the size of substances (particles, molecules) to be concentrated on the hollow space is small, attention should be paid to the width of an electrode. Because an area above the electrode will be a portion which is low in density of electric flux line for the substance than the hollow space. The reason why is that since a electric flux line is also generated from an edge of an electrode in contact with the hollow space, a degree of influence caused by the electric flux line generated from an edge of an electrode in contact with the hollow space is different depending on the size of the substance. Where the substances to be concentrated on the hollow space are small, this problem can be solved by narrowing the width of an electrode having the hollow space.

The shape of the electrode and the hollow space may be a circle, oval or a polygon, the shape of which is not particularly restricted. Also, the width of the electrode itself may be wider or a thin like a wire. In short, the construction of an electrode may be employed so that an electrode is not present in an area in which detected objects subjected to the negative dielectrophoretic force are concentrated, and in a vertical direction thereof.

Since even the same electrode construction, there appears a difference in a region where the measured objects are concentrated due to the change of the frequency of the electric field applied, and conductivity and dielectric constant of the measured object and the medium, the electrode construction may be decided according to the frequency of the electric field applied according to the using object. Conversely speaking, the substances to be measured can be concentrated at the desired position by varying the frequency or the like adjusting to the electrode construction.

Preferably, the hollow space 12 may be formed in the electrode, for example, by physical means such as a cutting method using, for example, a suitable knife or the like and embossing method, chemical means such as etching for removing an electrode, for example, using an etching liquid, or for example, by physical and chemical means such as Reactive Ion Etching (RIE) using a reactive gas formed into plasma by a high frequency power supply, and so on.

The electrode formed with the vacant space 12 of the present invention is preferably prepared, for example, by the fine processing technique (Biochim. Bophys. Acta. 964, 231–230 and so on) as described below:

(A) For example, a resist is coated on a base plate having copper, gold, aluminum or the like laminated thereon, and an electrode photomask is laminated on the resist. Then, light is irradiated to expose and develop the resist to dissolve a resist corresponding to a vacant space and a portion other than the electrode, which is then dipped into an etching liquid to apply etching to the electrode surface (aluminum surface), and the remaining resist on the electrode surface is removed. It is noted that the resist may be a positive resist for removing a portion exposed to light or a negative resist for removing a portion not exposed.

(B) Lift off method

After a resist is coated on a base plate, an electrode photomask is laminated on the resist, to which is applied exposure. Then development is carried out to remove a resist corresponding to an electrode portion, and an electrode material is laminated on the whole upper surface by vapor deposition or sputtering. Then, a resist corresponding to a portion other than the electrode and a vacant space (an electrode is laminated on the upper surface) is removed.

(C) Metal mask method

A metal mask with only the electrode portion applied with hollowing is laminated on a base plate, on which upper surface is coated with an electrode material by vapor deposition or sputtering. Then, the metal mask (an electrode material is laminated on the upper surface) is removed.

In the present invention, an electrode is one made of conductive materials such as, for example, aluminum, gold, copper and the like. Its structure can be any structure capable of causing dielectrophoretic forces, that is, forming a horizontally and vertically non-uniform electric field, including, for example, an interdigital shape [J. Phys. D: Appl. Phys. 258, 81–89 (1992); Biochim. Biophys. Acta., 964, 221–230 (1988), and the like].

The electrode of the present invention is, preferably, formed on the upper surface and/or the lower surface of the base plate (substrate). Normally, since the liquid containing the substance to be measured is caused to flow above the electrode, an electrode formed on the upper surface of the base plate is used. However, an electrode is placed in a state that floated in hollow, and the liquid containing the substance to be measured can be flown below the electrode. In this case, an electrode formed on the lower surface of a base plate or on both upper and lower surface of a base plate is used.

Figure 5:
FIG. 5 is a plan view showing another embodiment of an electrode of the present invention.

The electrodes used in the present invention include, for example, an electrode in the shape having many electrodes of the same shape (hexagon) associated, as shown in FIGS. 3 and 4, and an electrode formed such that a cathode and an anode are provided internally and externally, respectively, and longitudinal and lateral parts are made to the same or somewhat different, as shown in FIG. 5.

Since in the electrode as shown in FIGS. 3 and 4, negative dielectrophoretic regions can be formed in not only one place but several places, several hollow spaces having an area which is low in density of the same electric flux line can be prepared, whereby the fluorescent strength of several places is measured and averaged to thereby obtain data with reliability.

Further, in an electrode provided with a cathode and an anode internally and externally, respectively, as shown in FIG. 5, there is one measuring place, but since a space require is small, that can be contributed to integration of measurement of many inspected objects.

Figure 6:
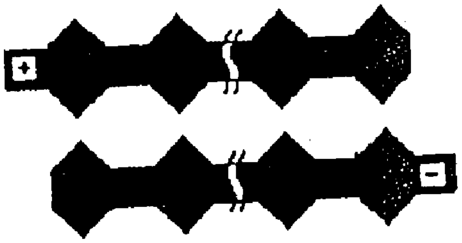
FIG. 6 PRIOR ART
FIGS. 6A and 6B are plan views showing examples of a conventional electrode.
Figure 6:
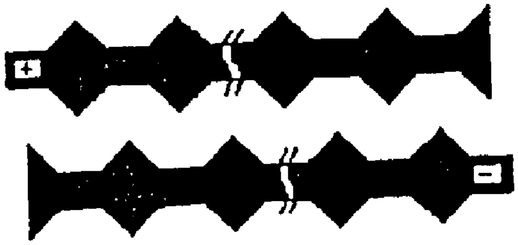
FIG. 6 PRIOR ART
Figure 7:
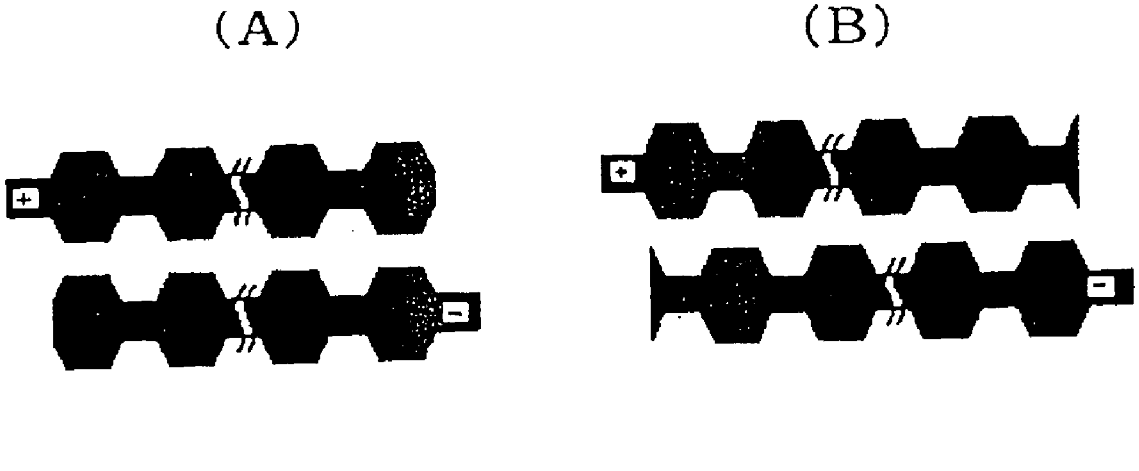
FIG. 7 PRIOR ART
FIGS. 7A and 7B are plan views showing further examples of a conventional electrode.
Figure 8:
FIG. 8 PRIOR ART
FIGS. 8A and 8B are plan views showing other examples of a conventional electrode.
Figure 8:
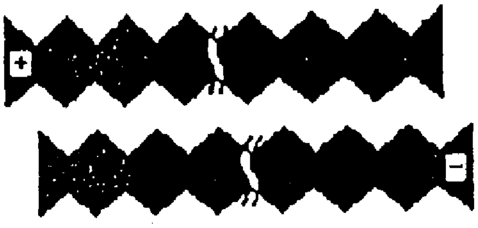
FIG. 8 PRIOR ART
Figure 9:
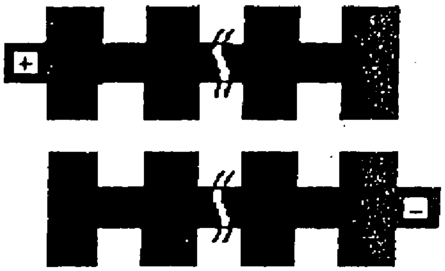
FIG. 9 PRIOR ART
FIGS. 9A and 9B are plan views showing still other examples of a conventional electrode.
Figure 9:
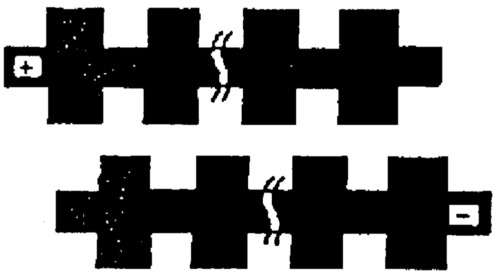
FIG. 9 PRIOR ART
Figure 10:
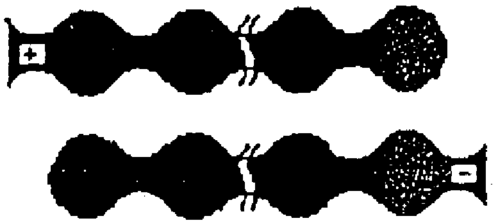
FIG. 10 PRIOR ART
FIGS. 10A and 10B are plan views showing other examples of a conventional electrode.
Figure 10:
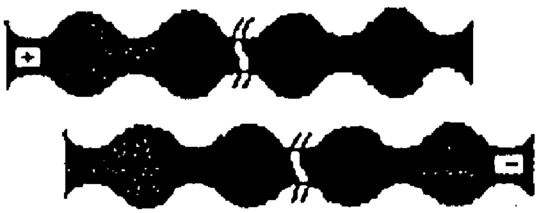
FIG. 10 PRIOR ART
Figure 11:
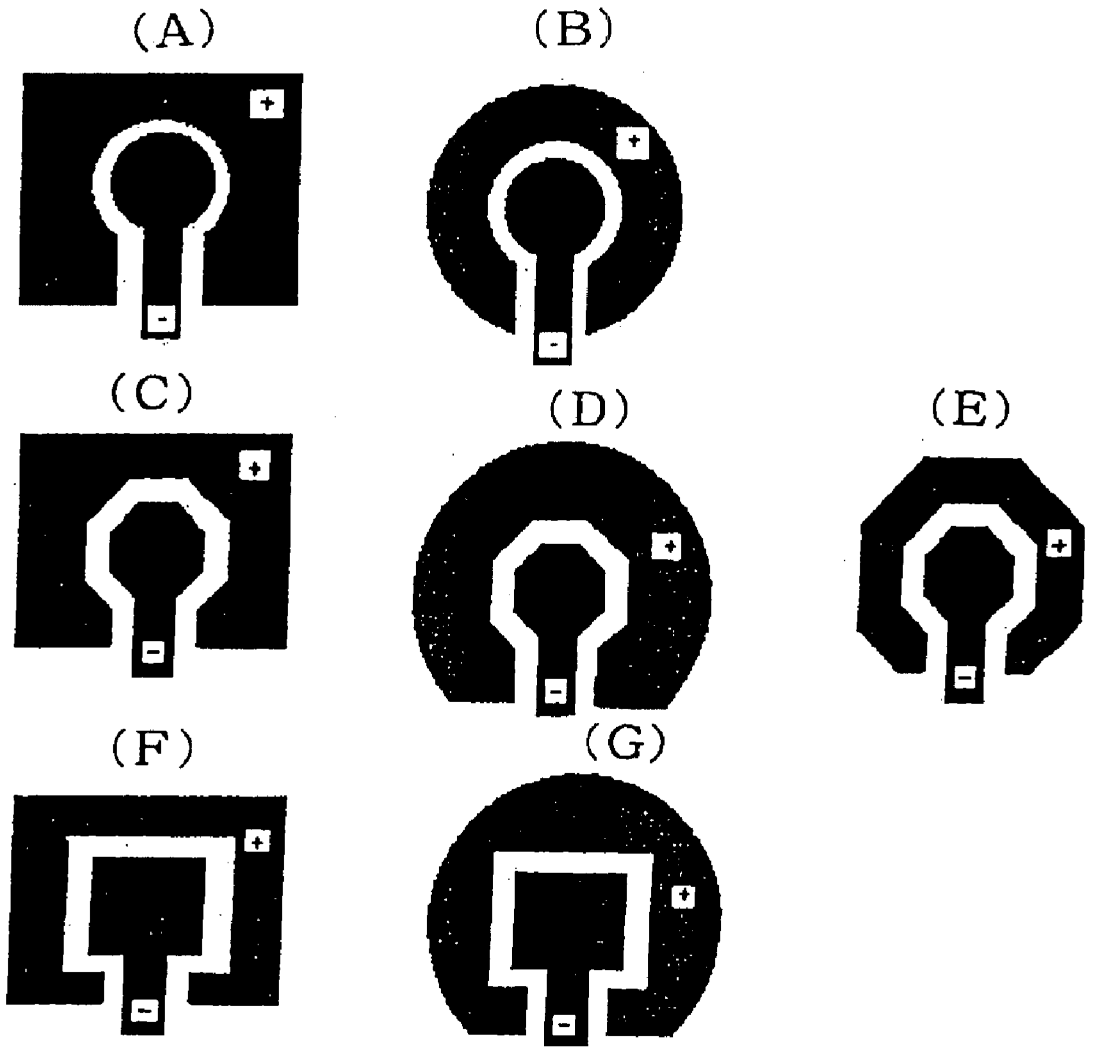
FIG. 11 PRIOR ART
FIGS. 11A through 11G are plan views showing still other examples of a conventional electrode.

Other concrete examples of electrodes as shown in FIGS. 3 and 4 include a shape in which many triangular outwardly projecting parts are associated in a spaced relation opposite to upper and lower portion of a linear web as shown in FIG. 6, a shape in which many trapezoidal outwardly projecting parts are associated in a spaced relation opposite to upper and lower portion of a linear web as shown in FIG. 7, a shape in which many hexagons are associated linearly as shown in FIG. 8, a shape in which many square outwardly projecting parts are associated in a spaced relation opposite to upper and lower portion of a linear web as shown in FIG. 9, and a shape in which many semicircular outwardly projecting parts are associated in a spaced relation opposite to upper and lower portion of a linear web as shown in FIG. 10. While in (A) and (B) in FIGS. 6 to 10, shapes of ends are different, but either of them will suffice.

Further, other concrete examples of electrodes as shown in FIG. 5 include, for example, as shown in FIGS. 11(A) to (G), electrodes in which an external anode is formed to be polygon such as square and octagon, circle, semi-circle, and oval; and as an internal cathode, a cathode head located in a central part of the cathode is formed to be polygon such as square and octagon, circle and the like. In the present invention, any electrode can be used as long as the electrode itself can be used for dielectrophoresis for forming a hollow space, and the kind of electrodes is not restricted.

A base plate (substrate) used when an electrode is prepared is not particularly restricted if it can be used in this field, and a base plate formed of a non-conductive material, for example, such as glass, plastics, quartz, silicon or the like is preferred.

The base plate may be formed of a transparent material, but a material need not always be a transparent material if excitation light is not substantially reflected, or light is permeated to such an extent as capable of measuring absorbance.

The electrode may be similar to prior art except formation of a vacant space, and an organic layer may be formed on the electrode to prevent adsorption of various materials on the electrode.

For manufacturing the electrophoretic apparatus of the present invention using the electrode of the present invention formed with the vacant space as described above, those other than the electrode may be formed in a manner similar to prior art.

For embodying the separation method of the present invention using the electrode and the dielectrophoretic apparatus of the present invention formed with the vacant space as described above, the separation method itself may be carried out in a manner similar to prior art.

Namely, a liquid containing substances to be separated, a liquid in which for example, two or more kinds of substances (molecules or particles) are dissolved or suspended is placed in presence within a non-uniform electric field formed using the electrode as described above, and separation may be accomplished due to a difference in the dielectrophoretic force exerting on the substances. It is noted that an electric field applied in the present invention may be either DC electric field or AC electric field, but AC electric field is preferred.

In the separation method of the present invention, granular substances of 100 nm to 100 μm are easily concentrated on an area which is lower in density of electric flux line. Because the granular substances having the size to some extent may easily concentrated on an electrode having an area which is low in density of electric flux line in which substances to be measured are concentrated in the vacant space and above or below position of the space. However, it is possible, even when substances to be separated or measured are small particles or molecules, to constitute an electrode capable of forming an area which is low in density of electric flux line in upper and lower directions of the vacant space by narrowing the width of an electrode or deepening the depth (the distance between the electrode base plate and the cover glass and/or the distance from the vessel bottom to the electrode). In short, since the influence of electric flux line received by particles is different according to the size of particles, when the particle having the size to some extent is applied to the separation method of the present invention, an electrode in which the particles are concentrated in the vacant space or in upper and lower directions thereof can be easily formed.

Accordingly, for separating molecules or small particles, which are measured materials, in a solution of molecules or a suspension of small particles, a complex in which substances to be measured (through "substances binding to substances to be measured", if necessary) are bound to substances subjected to influence by the negative dielectrophoretic force, preferably, granular substances having the size of 100 nm to 100 μm is subjected to the separation method using a dielectrophoresis. This is, because of the fact that if the size of particles is too small, the width of the electrode need be extremely narrowed.

The granular substances are bound as described above whereby the substances are enlarged, and so, separation of the substances to be measured is facilitated. Accordingly, the granular substances function as substances for enhancing separation.

The granular substance used in the present invention includes inorganic metal oxides such as silica and alumina; metals such as gold, titanium, iron, and nickel; inorganic metal oxides and the like having functional groups introduced by silane coupling process and the like; living things such as various microorganisms and eukaryotic cells; polysaccharides such as agarose, cellulose, insoluble dextran; synthetic macromolecular compounds such as polystyrene latex, styrene-butadiene copolymer, styrene-methacrylate copolymer, acrolein-ethylene glycol dimethacrylate copolymer, styrene-styrenesufonate latex, polyacrylamide, polyglycidyl methacrylate, polyacrolein-coated particles, crosslinked polyacrylonitrile, acrylic or acrylic ester copolymer, acrylonitrile-butadiene, vinyl chloride-acrylic ester and polyvinyl acetate-acrylate; relatively large biological molecules such as erythrocyte, sugars, nucleic acids, proteins and lipids, and the like.

The "granular substance" are normally bound to "substance binding to substance to be measured" for use. By doing so, it can be bound to "substance to be measured" in a sample. However, the granular substance may be bound directly to the substance to be measured by a chemical binding method, for example, such as a method for introducing a functional group into the surface of the granular substance and afterwards binding through the functional group, or a binding method the granular substance to the substance to be measured through a linker.

Further, for binding the granular substance to the "substance binding to the substance to be measured", a method similar to a method for labeling the measured substance by a labeling substance described later may be employed.

Where a substance having properties capable of specifically binding to the substance to be measured directly is used as the granular substance, the operation as described above is unnecessary. The granular material as described includes, for example, nucleic acid, protein, lipid and so on.

The "substance binding to the substance to be measured" used in the present invention is bound to the granular substance for use to form a complex of the substance to be measured, the "substance binding to the substance to be measured", and the granular substance from the substance to be measured in a sample, and a complex of a molecule other than the substance to be measured, the "substance binding to the substance to be measured" and the granular substance may be not formed substantially, which is not particularly restricted. In short, even if being bound to the substances other than the substance to be measured, it will suffice if that may not form the aforesaid three complex substance. However, it is actually preferred that the "substance specifically binding to the substance to be measured is used.

A "substance binding to the substance to be measured" refers to a substance binding to the "substance to be measured" by interactions such as an "antigen"-"antibody" reaction, a "sugar chain"-"lectin" reaction, an "enzyme"-"inhibitor" reaction, a "protein"-"peptide chain" reaction, and a "chromosome or nucleotide chain"-"nucleotide chain" reaction. If one partner is the substance to be measured in each combination described above, the other is a "substance binding to the substance to be measured" as described above.

For forming a complex of binding the substance to be measured in a sample with the granular substance directly or through the "substance binding to the substance to be measured", a sample containing the substance to be measured, the granular substance and, if necessary the "substance binding to the substance to be measured" are, for example respectively dissolved, dispersed or suspended in water or a buffer liquid, for example, such as tris (hydroxymethyl amino methane) buffers, a Good's buffer, a phosphate buffer, borate buffer into a liquid material, and these liquid material may be mixed and contacted with each another.

The separation method of the present invention is roughly divided into two methods as follows:

[Separation Method 1]

First, where the substance to be measured, or the complex of the substance subjected to influence of the negative dielectrophoretic force (substance for enhancing separation) and the substance to be measured (through "substance binding to the substance to be measured", if necessary) exhibits the same negative dielectrophoretic force as that of the substance other than the substance to be measured, in case of the substance to be measured or the complex showing the greater dielectrophoretic force than that of the substance other than the substance to be measured, only substantially the substance to be measured, or substance for enhancing separation and the complex of substance for enhancing separation and the substance to be measured receive the great dielectrophoretic force and are separated.

Namely, for example, by suitably setting the electric field strength and the medium conditions in such a way that the substance to be measured or the complex substance of the substance subjected to influence of the negative dielectropherotic force and the substance to be measured (through "substance binding to the substance to be measured, if necessary) is concentrated in the vacant space above the dielectropherotic electrode or in the upper and lower directions thereof, but that the substances other than the substance to be measured are not concentrated, these substance to be measured and the substance other than the substance to be measured can be separated.

The method of the present invention is suited for separation in the state free from flow. However, the so-called dielectrophoretic chromatography apparatus (Field Flow Fractionation apparatus) which carries out separation by the interaction of the dielectrophoretic force generated in molecules by the electric field and the movement of molecules, may be used to carry out separation. In this case, by suitably setting the flow velocity (speed is made slow) in such a way that only substance to be measured or the complex of the substance subjected to influence of the negative dielectrophoretic force and the substance to be measured (through "substance binding to the substance to be measured, if necessary) is collected in the vacant space of the electrode or in the upper and lower directions by the dielectrophoretic force, these substance to be measured and the substances other than the substance to be measured can be separated. In the condition that the substance trapped in the hollow space of the electrode or in the upper and lower directions thereof is not moved by the flow, many samples can be applied to the hollow space of the electrode by the measurement in the flow, thus enhancing the measurement sensitivity.

[Separation Method 2]

Second, where the substance to be measured or the complex of the substance subjected to influence by the negative dielectropherotic force and the substance to be measured (through "substance binding to the substance to be measured", if necessary) is one subjected to influence by the negative dielectropherotic force different from substances other than the substance to be measured, namely where the substance to be measured or the complex of the substance for enhancing separation (substance subjected to influence by the negative dielectropherotic force) and the substance to be measured exhibits the negative dielectropherotic force and the substances other than the substance to be measured exhibits the positive dielectropherotic force, either of ① the substance to be measured or the complex of the substance to be measured and the substance subjected to influence by the negative dielectropherotic force and ② the substances other than the substance to be measured moves to the hollow space or in the upper and lower directions thereof while the other moves to a different electrode region whereby the substance to be measured can be separated from the substances other than the substance to be measured.

When the substance to be measured separated by the separation method according to the present invention can be detected by a method according to properties own by the substance, the presence or absence of the substance to be measured contained in a sample can be measured (detected).

Namely, using the dielectrode according to the present invention, the dielectrode constitution and the dielectrophororetic apparatus, a liquid material (sample) containing the substance subjected to influence by the negative dielectropherotic force generated by application of voltage to the electrode [or substance to be measured or the complex of the substance for enhancing separation and substance to measured (through "substance binding to the substance to be measured, if necessary")] is located at the electrode according to the present invention, or the vacant space or in the vicinity thereof, or is caused to flow above or below thereof, whereby the substances subjected to influence by the negative dielectrophoretic force are concentrated on the vacant space, above or below thereof, and afterwards, the substance to be measured in a sample can be detected by optically detecting the substance.

The substance to be measured in the above-described method is that can be measured by any optical method, or that can be labeled by an optically detectable labeling substance, or bound to the "substance binding to the substance to be measured" that can be measured (detected), or that can be labeled by an optically detectable labeling substance.

In the present invention, the substance to be measured or the "substance binding to the substance to be measured" may be labeled by the optically detectable labeling substance, and labeling itself may be carried out by a well-known labeling method generally carried out in a conventional method generally used in the field of, for example, well-known EIA, RIA, FIA or a hybridization method.

The optically detectable labeling substances which can be used in the present invention are any substances usually used in the art of enzyme immunoassay (EIA), fluoroimmunoassay (FIA), hybridization method, and the like, and are not particularly limited. However, the labeling substance capable of being detected by the fluorescent strength, the light emission strength or the absorbance is particularly preferred.

In the above-described method, as the "substance binding to the substance to be measured", the "substance binding to the substance to be measured" that can be measured (detected) by any optically detectable method or that can be labeled by an optically detectable labeling substance is generally used.

More concretely, the detection method according to the present invention may be carried out in a manner as described below.

The substance to be measured or the complex of the substance to be measured and the separation enhancing substance (if necessary, through the substance binding to the substance to be measured and/or the substance binding to the substance to be measured labeled by the optically detectable labeling substance) obtained by reacting the substance to be measured and the separation enhancing substance (if necessary, and the substance binding to the substance to be measured and/or the substance binding to the measured substance labeled by the optically detectable labeling substance) and the substances other than the substance to be measured (for example, the free substance binding to the substance to be measured or the free labeled substance to binding the substance to be measured ) are separated according to the separation method of the present invention as mentioned above. Next, the separated substance to be measured or the separated complex is optically detected on the basis of properties of the substance to be measured or the substance binding to the substance to be measured (or the labeling substance binding to the substance binding to the substance to be measured in the complex) in the complex to measure the presence or absence of the substance to be measured in the sample.

Further, according to the present invention, not only the presence of the substance to be measured in the sample can be detected, but also the amount of the substance to be measured in the sample can be measured quantitatively. The quantitative measurement of the substance to be measured may be done similarly to prior art where the complex is not formed, and in case where the complex substance is formed, the following method may be employed.

That is, the substance to be measured or the complex of the substance to be measured and the separation enhancing substance (if necessary, through the substance binding to the substance to be measured and/or the labeled substance binding to the measured substance) and the substances other than the substance to be measured [for example, the free substance binding to the substance to be measured (or the free labeled substance binding to the substance to be measured)] are separated according to the separation method of the present invention as described above. Next, the amount of the separated substance to be measured or the substance binding to the substance to be measured in the complex (or the optically detectable labeling substance binding to the substance binding to the substance to be measured in the complex), or the amount of the free substance binding to the substance to be measured (or the optically detectable labeling substance binding to the free labeled substance binding to the substance to be measured) are obtained by the optical measurement method according to these properties, and the amount of the substance to be measured in the sample can be obtained on the basis of the obtained amount.

In the above-described method, in order to obtain the amount of the substance to be measured in the sample on the basis of obtained amounts of the substance to be measured, the substance binding to the substance to be measured or the labeling substance, for example, the quantity of specific molecules in the sample may be calculated, by using a calibration curve showing a relationship between the amount of the substance to be measured, and the amount of the substance binding to the substance to be measured in the complex (or the labeled substance binding to the substance to be measured) or the amount of the free substance binding to the substance to be measured (or the optically detectable labeling substance in the labeled substance binding to the substance to be measured), obtained by carrying out the same measuring method mentioned above except for using a sample whose concentration of the substance to be measured is known.

Figure 12:
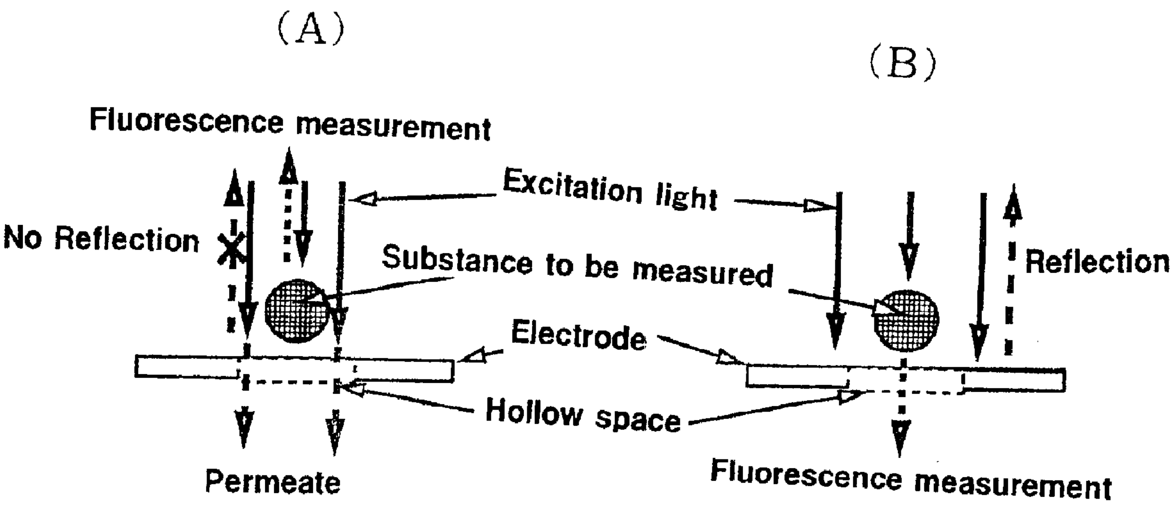
FIG. 12 is an explanatory view in the case where fluorescent measurement is made according to the method of the present invention, (A) showing the case where a fluorescent measuring unit is provided above, (B) showing the case where a fluorescent measuring unit is provided below.

According to the present invention, the substance to be measured (molecules to be measured) can be concentrated in the hollow space of the electrode or in the upper and lower directions thereof. When the excitation light is irradiated on the concentrated measured molecules, since the electrode is not present under the molecules, the background caused by being reflected even on the electrode is not detected, as compared with the case using the conventional electrode, as shown in FIG. 12(A). As a result, the S/N ratio is enhanced, as compared with prior art and the measuring sensitivity is enhanced.

Further, if the electrode of the present invention is used, since the electrode is not present under the substances to be measured, a fluorescent detector can be provided on the opposite side as shown in FIG. 12(B). Further where it is provided on the opposite side, the S/N ratio is enhanced (slit effect) since the parts other than the region where the substances to be measured are concentrated are covered with the electrode, whereby in said parts the excitation light irradiated from the upper surface does not reach the lower surface, and therefore, the background can be reduced.

Further, according to the present invention, since the measurement can be done from the lower surface, the absorbance of the substances to be measured is measured, which has been heretofore impossible, to enable qaualitative (detection) and quantitative measurement of the substances to be measured.

In this case, the S/N ratio is further enhanced (slit effect) since the parts other than the region where the substances to be measured are concentrated are covered with the electrode, whereby in said parts light does not permeate through the electrode from the upper surface to the lower surface, and therefore, the background can be further reduced.

In the following, the invention 2 will be described in detail.

Figure 14:
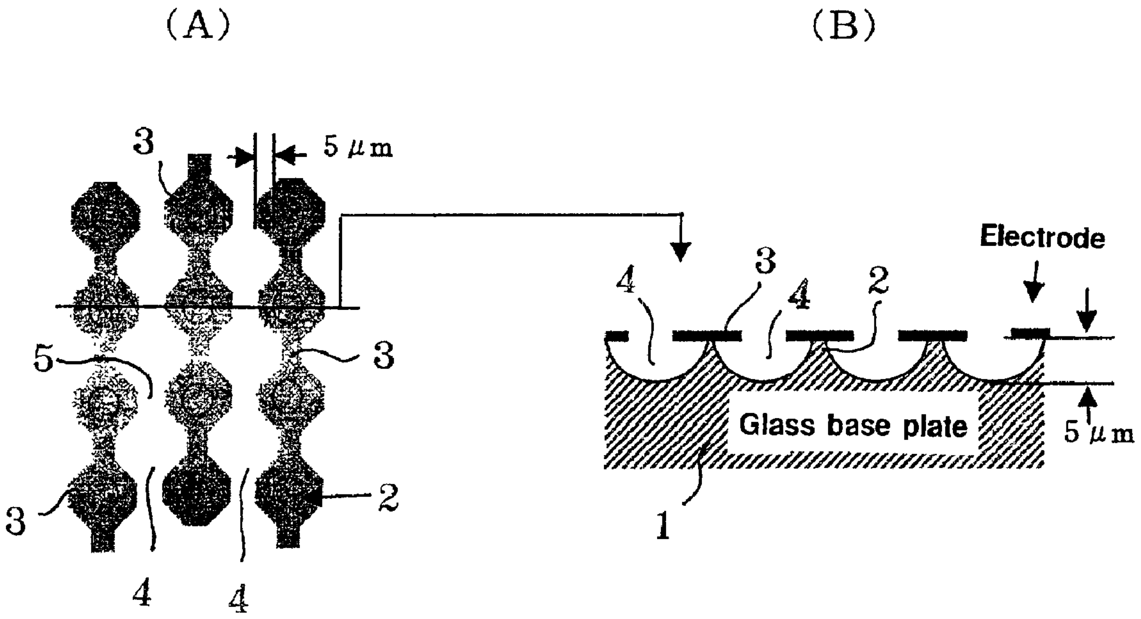
FIG. 14 are respectively, a plan view (A) and a sectional view (B) showing a further embodiment of the present invention.

FIG. 14 shows an embodiment of the present invention, showing an example in which an electrode 3 is supported in a lengthwise spaced relation by a convex member 2 (a support column) on a substrate (a glass substrate) 1.

A "lower level place than electrode level" (a communication groove) 4 which is semicircular in section is formed between the electrodes 3, 3, as shown in FIG. 14(B), and communication grooves 4, 4 adjacent to each other are communicated at parts other than the convex member 2, as shown in FIG. 14(A). However, alternatively, the electrode 3 is supported by a wall (a convex member) 2', and grooves 4', 4' adjacent to each other are isolated by the wall 2' so as not to be communicated, as shown in FIG. 15(B).

Figure 15:
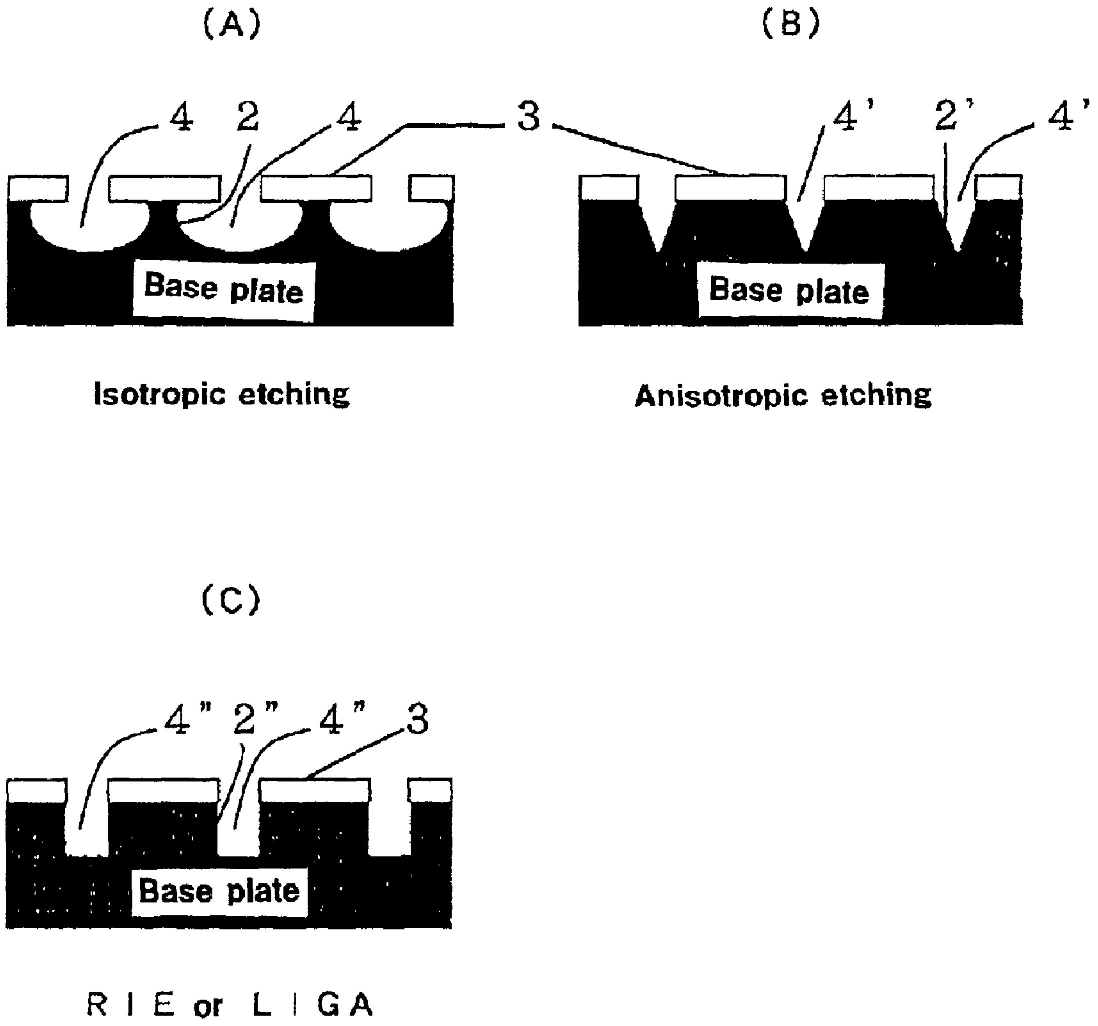
FIG. 15 is a sectional view showing an example of "lower level places than electrode level" of the present invention formed by isotropic etching (A), anisotropic etching (B), and RIE or LIGA (C)

In the embodiments shown in FIGS. 14 and 15, portions other than the convex members 2 and 2' are formed on the "lower level place than electrode 3 level" (4 and 4').

However, a concave portion (hole) may be singly or in plural in a spaced relation provided in a part between the electrodes 3, 3, but preferably, the whole or a major portion between or among electrodes is formed in a lower level place than the electrode (4 or 4')level as shown in FIGS. 14 and 15 to enhance the collecting ability.

Where the concave portion (hole) is formed in a part between the electrodes 3, 3, preferably, it may be formed in a minimum gap 5 between the electrodes. Since this portion is high in electric field strength, if the concave portion (whole) is formed in this portion, the collecting ability is further enhanced. However, if that is formed in the whole including this portion, further the collecting ability can be enhanced, because a portion for trapping molecules increases.

The width of the groove 4 (the same as the distance between the electrodes 3, 3 in the case shown in FIGS. 14 and 15) is suitably decided according to the size of substances as separated substances by the dielectrophoresis and is said absolutely though giving great effect to the electric field strength. In the substance of the size which is micrometer, the width is preferably, 1 time to 100 times of the diameter of the substance, more preferably, 1 time to 10 times. Further, in case of a bio-molecule such as a protein, a gene or the like, for example, such as a peptide, a protein or the like, normally, the width is 1 nm to 10 $\mu$m, preferably 1 nm to 5 $\mu$m. In case of nucleotide chain (polynucleotide, oligonucleotide), normally, the width is 1 nm to 100 $\mu$m, preferably 1 nm to 50 $\mu$m.

Generally, if the depth is deeper, a portion for trapping a molecule increases. Further, particularly, in case of Field-Flow fractionation, the flow velocity at the groove portion is suppressed to enhance the collecting ability (collecting rate). However, if being too deep, where it is necessary to measure a molecule trapped on the electrode by the dielectrophororesis, the molecule trapped is sometimes hard to be released from the groove portion or not released.

Accordingly, the depth of the groove is, preferably, 1/1000 times to 10 times of the width of the groove, more preferably, 1/1000 times to 1 time.

With respect to the depth of the groove, if isotropic etching is used for formation as shown in FIGS. 14 and 15, when the groove is made more than the width of the electrode, the convex member which holds the electrode is totally dug away whereby the electrode 3 is peeled off. Accordingly, when the groove is formed by this method, the depth of the groove is set to ½ or less of the maximum electrode width.

Where anisotropic etching of a silicon wafer is used for formation, as shown in FIG. 15(B), etching progresses only in a direction of depth at an angle of about 55 degrees. Accordingly, where etching is made by this method, the maximum distance depthwise (the distance between electrodes÷2)×1.42 (tan 55 degrees) results.

As shown in FIG. 15(C), where formation is made by RIE or LIGA, etching progresses substantially vertically. Accordingly, where etching is made by these methods, the depth of the groove is in the range described above, namely, preferably, 1/1000 times to 10 times, more preferably 1/1000 times to 1 time.

The spacing of the groove (=width of the electrode itself) is not affected by the separated object if limiting to separation by the positive dielectrophororesis. It is normally from the processing accuracy in the fine processing technique to 1 nm to 50 $\mu$m, more preferably, 1 nm to 10 $\mu$m.

The groove by the isotropic etching shown in FIG. 15(A) is formed by etching a glass base plate or a plastic base plate. In the isotropic etching, various shapes are formed according to the extent of etching such as the case where the electrode 3 is supported by the wall 2 on the base plate and the grooves 4, 4 adjacent to each other are formed so as to be isolated by the wall 2, or the case where the electrode 3 is supported by the convex member 2 on the base plate, and the grooves (communication grooves) 4, 4 adjacent to each other are communicated.

The groove by the anisotropic etching shown in FIG. 15(B) is formed by etching a silicon base plate. In this case, the electrode 3 is supported on the wall 2' on the base plate, and the grooves 4', 4' adjacent to each other are isolated by the wall 2'.

The groove by RIE shown in FIG. 15(C) is formed by etching a silicon or $SiO_2$ base plate, and the groove by LIGA is formed by etching polymer, ceramic, plastic base plate etc. In these cases, the electrode 3 is supported on the wall 2" on the base plate, and the grooves 4", 4" adjacent to each other are isolated by the wall 2".

In the isotropic etching shown in FIGS. 14 and 15(A), generally, the groove or the communication groove 4 is formed to have a shape whose section is semicircular, or semi-oval. When a groove is formed by the anisotropic etching shown in 15(B), generally, the groove 4' is subjected to etching into a substantially V-shape finally via a substantially trapezoid in section. When a groove is formed by RIE or LIGA shown in FIG. 15(C), generally, etching is made to a substantially square in section. Accordingly, various sectional shapes are formed according to the way of etching and the way of forming "a lower level place than electrode level", but in the present invention, the shape of "a lower level place than electrode level" (such as a communication groove, a groove, a concave part, etc.) are not particularly limited.

A wall or a convex member 2 in FIG. 15(A) is formed into a shape in which a central part is bound; a wall 2' in FIG. 15(B) is formed into a trapezoidal shape; and a wall 2" in FIG. 15(C) is formed into a square shape, but the wall, the convex member 2, the wall 2', and the wall 2" may be any shape as long as they can support the electrode 3, and are not particularly limited.

The electrode 3 used in the present invention is formed of a conductive material, for example, such as aluminum, gold or the like, and the construction thereof will suffice to be one which produce the dielectrophoretic force, that is, a non-uniform electric field in horizontal and vertical directions, for example, an interdigital shape [J. Phys. D: Appl. Phys. 258, 81–88, (1992), Biochim. Biophys. Acta. 964, 221–230, (1988), etc.] being listed.

Figure 16:
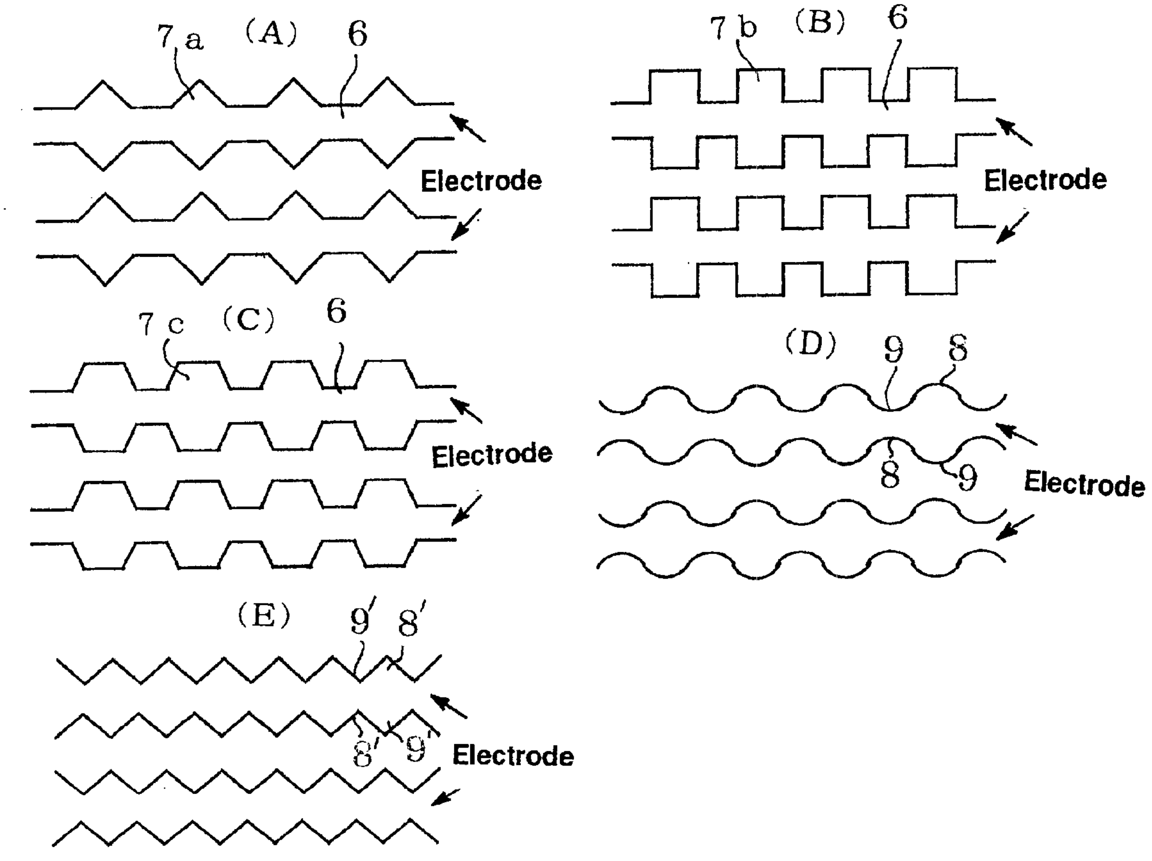
FIGS. 16A through 16E are plan views showing electrodes used in the present invention.

More concretely, preferable are, as shown in FIG. 16, (A) a shape in which many triangular outwardly projecting parts **7*a* are formed in a spaced relation opposite to upper and lower parts of a linear web-like part 6; (B) a shape in which many square outwardly projecting parts 7*b* are formed in a spaced relation opposite to upper and lower parts of a linear web-like part 6; (C) a shape in which many trapezoidal outwardly projecting parts 7*c* are formed in a spaced relation opposite to upper and lower parts of a linear web-like part 6; (D) being sine wave shape at upper and lower portions, a shape in which many sine wave convex parts 8 and concave parts 9 (concave part 9 and convex part 8) are formed linearly opposite to upper and lower portions; and (E) being saw-tooth shape at upper and lower portions, a shape in which many convex parts 8' of saw-tooth and concave parts 9' (concave part 9' and convex part 8'**) are formed linearly opposite to upper and lower portions. However, any shape can be used if the electrode can be used for dielectrophoresis, and the shapes are not particularly limited.

Such an electrode as described is normally prepared by providing a pair or more electrodes having shapes as described above on comb-tooth-wise on a base plate formed of a non-conductive material, for example, such as glass, plastic, quartz, silicon, etc. by using known fine processing technique [Bichim. Bioophys. Acta., 964, 221–230, etc.]. Further, the distance between the electrodes 3 opposite (adjacent) to each other is not particularly limited as long as a non-uniform AC electric field of strong electric field strength can be formed, and should be suitably set according to the kind of molecules intended.

The thickness of the electrode 3 may be similar to prior art, and concretely, the thickness is normally 0.5 nm or more, preferably, 0.5 nm to 1000 nm, more preferably, 1 nm to 1000 nm.

The electrode 3 may be similar to prior art except the thickness, and an organic layer may be formed on the electrode in order to prevent adsorption of various materials on the electrode.

The dielectrophoretic apparatus according to the present invention may be manufactured in a manner similar to prior art except "a lower level place than electrode level" (such as a communication groove 4, a groove 4', a concave portion etc.) such as a flow path and a dielectrophoretic electrode.

The "lower level place than electrode level" maybe formed, for example, by excavating a base plate between electrodes by means of physical means such as an excavating method using a suitable knife or the like, a LIGA (Lithographile Galvanoformung Abformung) method using a synchrotron radiant light and an embossing method using a suitable embossing die; chemical means for excavating a base plate, for example, using an etching liquid for a base plate; or physical and chemical means such as etching using reactive gases formed into plasma by a high frequency power supply [Reactive Ion Etching (RIE)].

It is noted that the above-described means may be combined suitably to carry out excavation of a substrate.

As an etching liquid, a known etching liquid may be selected according to material of a substrate. Where a lower level place than electrode level is formed in a part of a substrate, etching may be accomplished with masking is suitably applied to a portion which is not desired to be excavated.

For embodying the separation method of the present invention using the dielectrophoretic apparatus according to the present invention, the separation method itself is the same as prior art.

That is, a liquid containing a substance to be separated, for example, a liquid in which more than two kinds of substances (molecules or particles) are dissolved or suspended is present in a non-uniform electric field formed using the electrode (electrode base plate) as described above whereby separation may be accomplished by a difference of the dielectrophoretic force exerting on the substances.

Generally, a non-uniform electric field is formed horizontally and vertically within a flow path on the substrate to cause to flow a liquid containing a substance to be separated from an inlet, and separation may be accomplished by a difference of the dielectrophoretic force exerting on the substances. However, of course, the substance may be separated into a component held in a specific portion of an electrode and a component not held for carrying out separation without generating a flow.

For separating by a difference of the dielectrophoretic force exerting on the substances (molecules, particles), the substance may be separated into a molecule etc. held in a specific portion of an electrode and a molecule etc. not held. Or, since molecules subjected to a stronger dielectrophoretic force move later than molecules subjected to a weak dielectrophoretic force, separation may be accomplished making use of the fact that a difference is produced in moving time.

Figure 17:
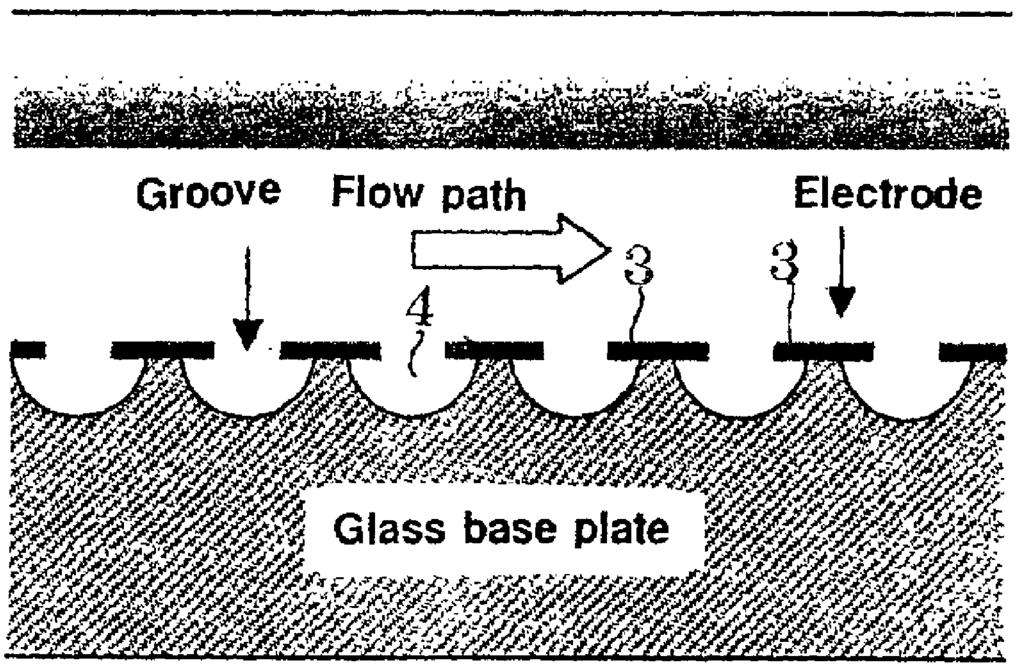
FIG. 17 is a sectional view of a dielectrophoretic chromatography apparatus.

As shown by an arrow in FIG. 17, when a liquid containing a substance to be separated in a direction crossing the lengthwise of an electrode is caused to flow into a flow path of the apparatus according to the present invention, the flow velocity in the communication passage (groove) 4 becomes slower than that of the flow path portion so that the drag Fv of fluid applied to the molecule entered the communication groove 4 can be reduced. Further, by the provision of the communication groove 4 between the electrodes 3, 3, the range affected by the electric field becomes widened, and the space where the trapped molecules are stocked becomes widened whereby the collecting rate (ability) is enhanced.

The measuring method of the present invention may be carried out in conformation with the known method as described above other than that using the separation method of the present invention, and the reagents used may be suitably selected from the well-known reagents.

While the present invention will be further described hereinafter concretely with reference to examples and reference examples, the present invention is not at all limited thereto.

EXAMPLES

Example 1

Figure 13:
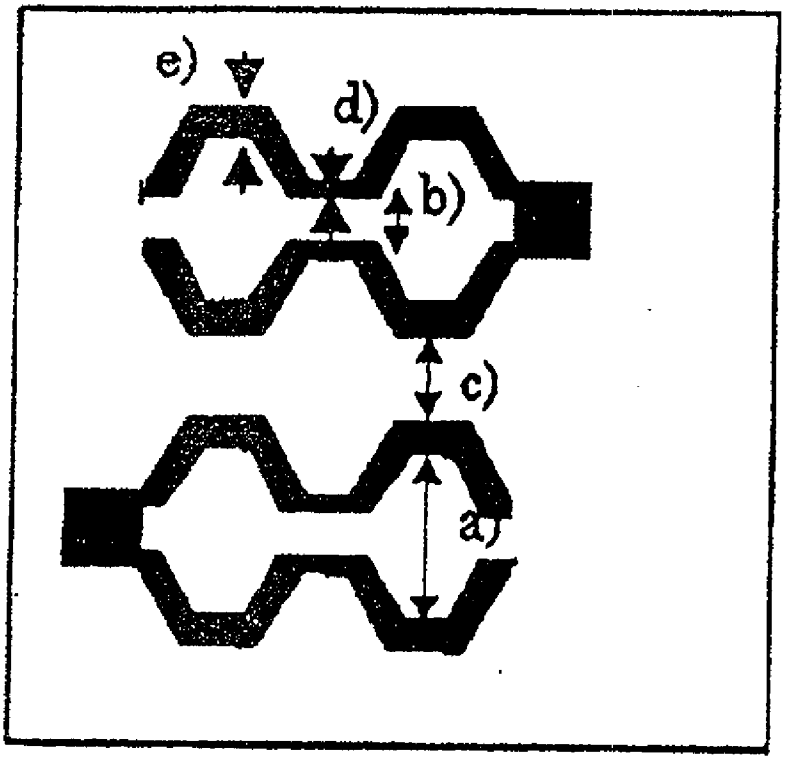
FIG. 13 is a plan view showing an electrode of the present invention prepared in Example 1.

Preparation of an Electrode of the Present Invention Formed with a Vacant Space by Etching The electrode according to the present invention was prepared by coating a resist on a glass base plate applied with aluminum vapor deposition, then exposing through laminating a photomask having an electrode and vacant space pattern depicted by an electron beam depicting device on the resist, and developing the resist, dissolving a resist film corresponding to the vacant space and portions other than the electrode, and thereafter dipping it into an etching liquid to apply etching to an aluminum surface, and removing the resist remained on the aluminum surface to form an electrode having a vacant space shown in FIG. 13.

The pattern of the vacant space was changed to prepare electrodes 1 to 4 different in length (μm) of a) to e) in FIG. 13. Table 1 shows the length (μm) of a) to e) of electrodes 1 to 4 prepared.

TABLE 1

| | Electrode 1 (μm) | Electrode 2 (μm) | Electrode 3 (μm) | Electrode 4 (μm) |
|---|---|---|---|---|
| a | 14 | 8 | 8 | 8 |
| b | 8 | 2 | 2 | 2 |
| c | 5 | 5 | 10 | 15 |
| d | 2 | 2 | 2 | 2 |
| e | 3.5 | 3.5 | 3.5 | 3.5 |

Example 2

Dielectrophoretic Test of Beads on a Hollow Electrode

Where beads having a diameter of 1 μm was subjected to dielectrophoresis using a conventional electrode, beads are concentrated (gathered) at a position on the electrode whose field strength is weak. In the design of the electrode prepared in Example 1, the aluminum electrode portion in a region where the beads are gathered are excluded.

A dielectrophoretic test was conducted under the electric field that the beads show the negative dielectrophoresis on the electrode (electrode 2 in Table 1) prepared in Example 1, using beads having a diameter of 1 μm with the fluorescent-labeled surface thereof.

A sample solution with the beads suspended was dropped above the electrode substrate (hollow space), and afterward, a cover glass was put, and observation was made by an optical microscope.

As a result of observation of the dielectrophoretic test, it has been confirmed that the beads were concentrated in the hollow space (vacant space) of the electrode by the negative dielectrophoretic force. The beads were concentrated while floating in the solution above the hollow space (near the cover glass).

Reference Example 1

Manufacture of Dielectrophoretic Electrode Substrate

A multi-electrode array having a minimum gap of 7 μm, an electrode pitch of 20 μm, and the number of electrodes of 2016 (1008 pairs) was designed, and a photomask according to the design was made for manufacturing the electrode as follows.

On a glass substrate on which aluminum was deposited and to which a photoresist was applied, an electrode pattern as designed was drawn on an electron beam drawing machine, and then the photoresist was developed and the aluminum was etched to make the photomask.

The electrode substrate was manufactured according to the method described in T. Hashimoto, "Illustrative Photofabrication", Sogo-denshi Publication (1985), as follows.

The photomask thus made was contacted tightly with the aluminum-deposited glass substrate to which a photoresist was applied, and then exposed to the electrode pattern with a mercury lamp. The electrode substrate was manufactured by developing the exposed glass substrate for the electrode and etching the aluminum surface, followed by removing the photoresist remained on the aluminum surface.

Example 3

Figure 18:
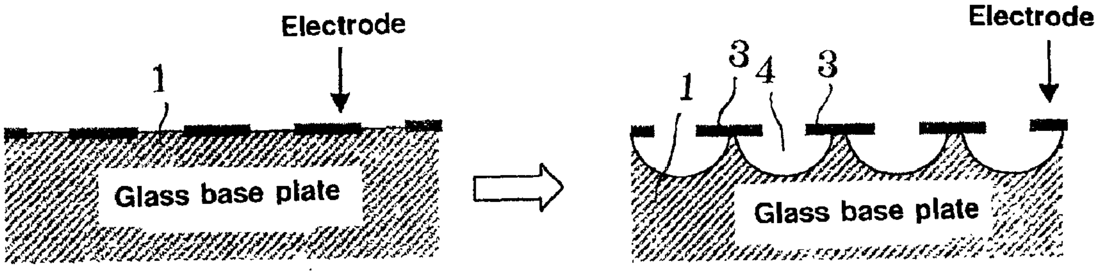
FIG. 18 is a sectional view showing an example of forming "lower level place than electrode level" on a base plate (substrate) according to the method of the present invention.

Formation of "Lower Level Place than Electrode Level" on a Substrate by Etching As shown in FIG. 18, etching was applied to the glass substrate 1 of the dielectrophororetic electrode prepared in a manner described in Reference Example 1 to form a communication groove 4 in a portion among the electrodes 3 on the glass substrate 1.

As an etching liquid, sodium fluoride sulfuric acid ($NH_4F$ 3%, $H_2SO_4$, $H_2O$) was used. Sodium fluoride sulfuric acid has properties to dissolve both glass and aluminum, but since the speed for etching glass is very quick as compared with that for etching aluminum, a glass portion other than the aluminum electrode can be subjected to etching with an aluminum electrode as a mask.

It is observed that in case where the thickness of aluminum of an electrode is 40 nm, when etching to the depth of 3 μm or more is done, an electrode is bent by a flow of water when the etching liquid is washed with pure water. However, in case of thickness of 250 nm, the phenomena that the electrode is bent was not observed.

Figure 19:
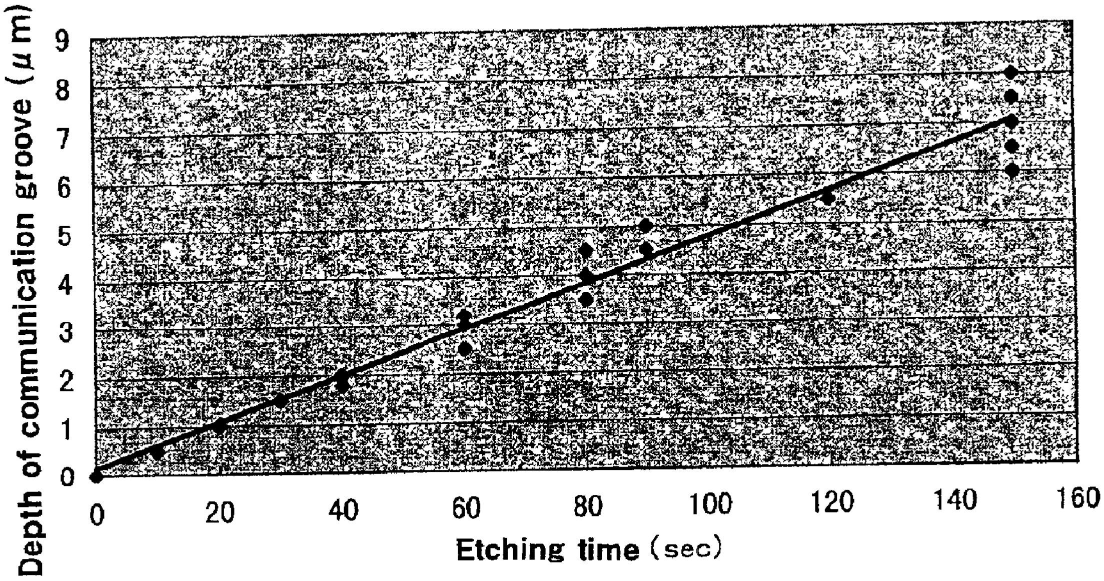
FIG. 19 is a graph showing a relationship between etching time and the depth of a groove measured in Example 3.

A relationship between an etching time (sec.) and the depth (μm) of a communication groove formed between electrodes, upon etching, was measured. The result indicated that the etching time and the depth of a groove to be formed are in a proportional relation as shown in FIG. 19. The depth of a groove was measured by cutting an electrode with a glass cutter and observing its section with a microscope.

Reference Example 2

Manufacturing an Electrode Substrate Having a Flow Path

In order to separate molecules by the movement of the molecules under an non-uniform electric field, a flow path on the electrode substrate manufactured in Example 3 was made using silicone rubber.

The silicone-rubber flow path for sending a solution containing dissolved molecule on the electrode had a depth of 25 μm and a width of 400 μm and was designed such that the flow path runs through a region in which the electrode on the electrode substrate was placed.

Its manufacturing was carried out according to the method described in T. Hashimoto, "Illustrative Photofabrication", Sogo-denshi Publication (1985). At first, a sheet-type negative photoresist having a thickness of 25 μm was applied onto the glass substrate, exposed through a photomask designed for making the flow path, and the negative photoresist was developed. Uncured silicone rubber was cast using the negative-photoresist substrate as a template, and then was cured to produce a silicon rubber surface having the concave surface with a height of 25 μm in the region where the electrode was placed.

The electrode substrate and the silicone-rubber flow path were adhered with a two-fluid-type curing silicone rubber such that the concave surface of the silicone rubber was faced to the region where the electrode on the electrode substrate was placed. A syringe for injecting a solution was placed upstream of the flow path, and an apparatus allowing a solution in which the molecules were dissolved to flow on the electrode was added to the electrode substrate.

Example 4

Measurement of Collecting Rate with Respect to Bovine-serum Albumin (BSA) Protein An electrode formed with a communication groove having the depth of 2 μm or 4 μm was prepared as in Example 3, a flow path was prepared as in Reference Example 2, a dielectrophoretic chromatography device of the present invention was prepared, and the collecting rate of the device was measured in the following manner. For the purpose of comparison, with respect to the dielectrophoretic chromatography device prepared similarly except that a communication groove is not formed, the collecting rate was also measured.

(Sample)

As a sample, a solution containing FITC labeled BSA (molecular weight: approximately 65 kD) (60 μg/ml )was used.

(Operation)

For preventing adsorption of protein molecules to the electrode substrate or flow path, a block A (manufactured by Snow Brand Milk Products CO., Ltd.) was used to block the surface of the flow path, after which FITC labeled BSA was applied to the dielectrophoretic chromatography device.

The average speed of the sample used was 556 μm/sec., and the electric field was applied for 30 to 120 seconds from a start of measurement. The collecting rate was measured with respect to the electric field strength applied at that time of 2.14 Mv/m, 2.5 Mv/m, and 2.86 Mv/m.

The measurement of the collecting rate was obtained by the following Equation.

$$\text{Collecting rate } (\%)=[(I_0-I_{min})\times 100]/(I_0-I_{back})$$

Wherein $I_0$ represents the fixed value of the fluorescent strength before application of electric field, $I_{min}$ represents the minimum value of the fluorescent strength during application of electric field, and $I_{back}$ represents the background.

(Results)

Figure 20:
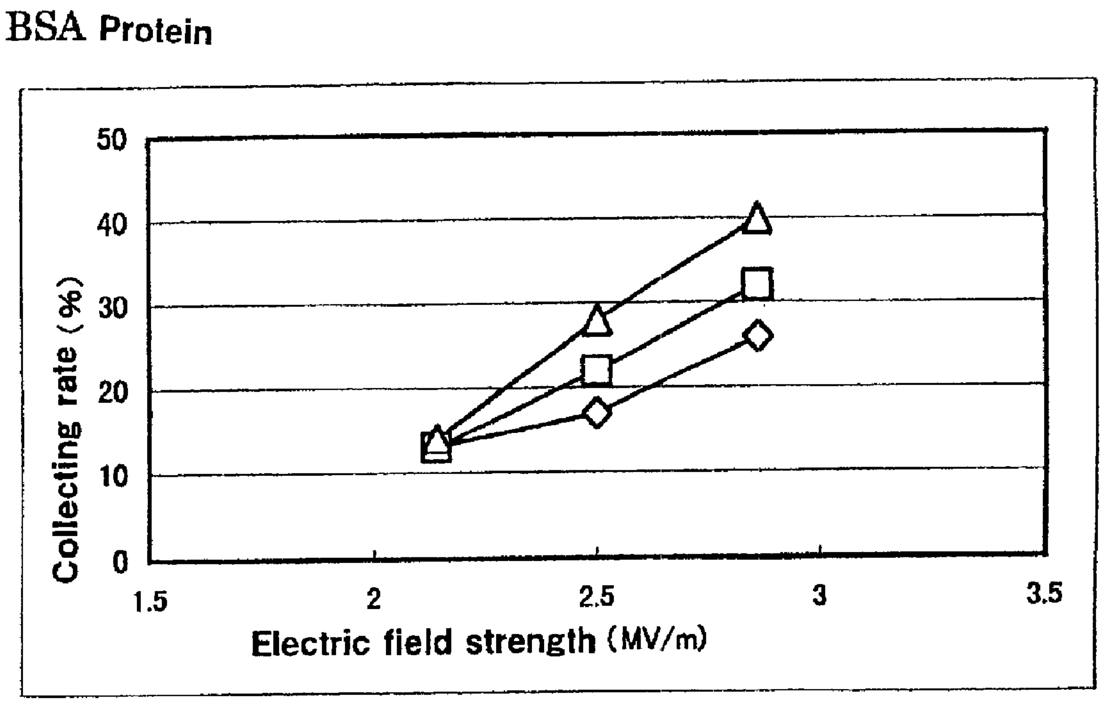
FIG. 20 is a graph which measured the collecting rate with respect to bovine-serum albumin (BSA) protein, using the dielectrophoretic chromatography apparatus according to the present invention and the conventional dielectrophoretic chromatography apparatus.

FIG. 20 shows the results. In FIG. 20, there is shown the results obtained by the use of the dielectrophoretic chromatography device of —Δ—(depth 4 μm), —□—(depth 2 μm), and —◇—(depth 0 μm).

As is clear from the results shown in FIG. 20, the deeper the depth of groove, the collecting rate (%) enhances. In 2.86 Mv/m, the collecting rate of the apparatus of the present invention having the communication groove of 4 μm is 40% as compared with the collecting rate 28% of the conventional apparatus having no communication groove, and the collecting rate was enhanced by about 43%, in other words, the collecting ability of the substances intended is remarkably enhanced by the use of the apparatus according to the present invention.

Example 5

Figure 21:
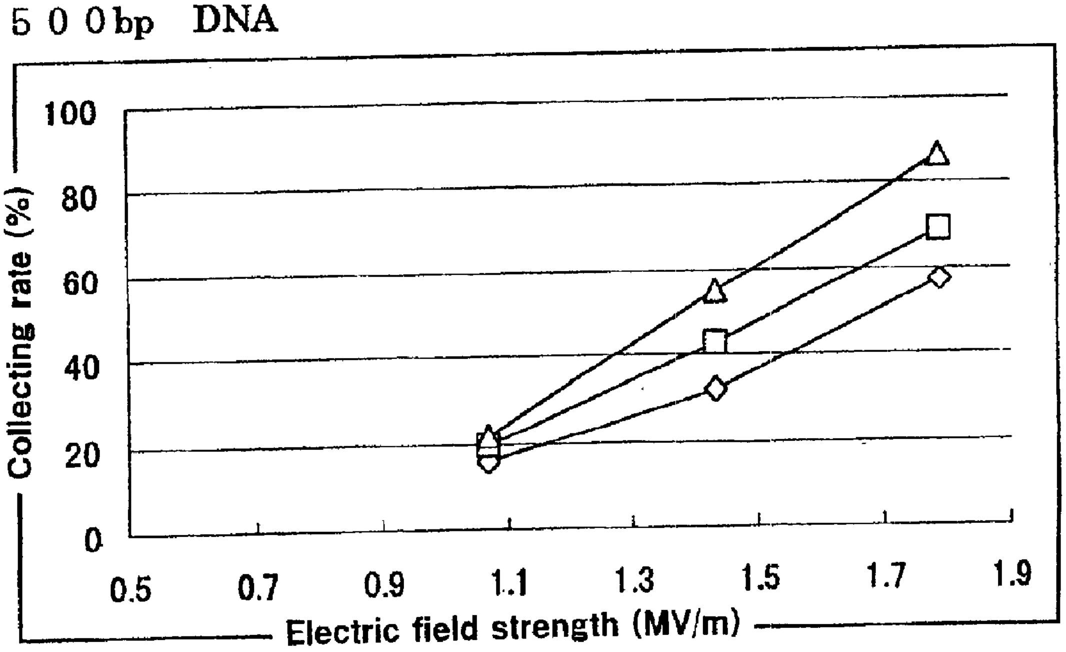
FIG. 21 is a graph which measured the collecting rate with respect to 500 bp DNA, using the dielectrophoretic chromatography apparatus according to the present invention and the conventional dielectrophoretic chromatography apparatus.

Measurement of Collecting Rate to 500 bpDNA 500 bpDNA labeled by intercalator fluorescent dye YOYO-1(Molecular Probe Ltd.) was used as a sample. The collecting rate (%) was measured by the dielectrophoretic chromatography device of the depth of groove, 0 μm, 2 μm and 4 μm. FIG. 21 shows the results.

In FIG. 21, there is shown the results obtained by the use of the dielectrophororetic chromatography device having the communication groove of —Δ—(depth 4 μm), —□—(depth 2 μm), and —◇—(depth 0 μm).

As is clear from the results shown in FIG. 21, Also in this case, in the electric field strength of 1.5 Mv/m or more, the collecting rate of the apparatus of the present invention having the communication groove of depth 4 μm was enhanced by about 20% as compared with the conventional apparatus having no communication groove.

ADVANTAGEOUS EFFECT OF THE INVENTION

According to the invention 1, since the substances to be measured can be concentrated (gathered) in the hollow space of the electrode or in the upper and lower directions thereof, the electrode is not present under the substances to be measured, and therefore, where the fluorescent strength is detected, the reflection of the excitation light by the electrode under the measured substances is avoided. As a result, the background is reduced, the S/N ratio is enhanced, and the measurement sensitivity is enhanced. Further, the measurement can be made from the lower surface of the electrode. Further, according to the present invention, since the measurement can be made from the lower surface, it is possible to measure the substances to be measured by the absorbance that has been impossible in prior art.

When the measurement is made from the lower surface of the electrode, since the parts other than the region where the substances to be measured are concentrated are covered with the electrode, whereby in said parts the excitation light irradiated from the upper surface does not reach the lower surface, the background is reduced, the S/N ratio is enhanced and the measurement sensitivity is enhanced (slit effect). This is an extremely great advantage.

According to the invention 2, the provision of lower level places than electrode level between or among electrodes which has not at all been done in prior art leads to the remarkable enhancement of the collecting ability (rate) which has a very important role for separation of substances by the dielectrophoresis, which is an enormous effect. This is therefore an extremely epoch-making invention.

What is claimed is:

1. A method of collecting substances comprising positioning liquid containing substances in the vicinity of a first electrode having a vacant space therein and a second electrode, said vacant space substantially surrounded by said first electrode such that the periphery of the vacant space is not defined in part or at all by the second electrode, subjecting said liquid containing substances to influence by a negative dielectrophoretic force generated by application of voltage to said first electrode, and collecting said substances subjected to influence by a negative dielectrophoretic force in the vicinity of said vacant space of said first electrode.

2. The method according to claim 1 wherein said first electrode is on a substrate and a lid is provided adjacent to said first electrode in such that a gap is formed between said first electrode and said lid, and said liquid containing substances subjected to influence by said negative dielectrophoretic force is provided in said gap to allow the substances to contact with the first electrode.

3. The method according to claim 2 wherein said substance subjected to influence by said negative dielectrophoretic force is a complex of a substance binding to a substance to be measured, a substance subjected to influence by a negative dielectrophoretic force, and the substance to be measured which binds to said substance binding to a substance to be measured.

4. The method according to claim 3 wherein said substance subjected to influence by a negative dielectrophoretic force is a granular substance subjected to influence by a negative dielectrophoretic force.

5. A method according to claim 1, wherein the liquid containing substances is positioned above the vacant space of the first electrode.

6. A method according to claim 1, wherein the liquid containing substances is positioned by causing the liquid to flow about the first electrode.

7. A method according to claim 6, wherein the liquid containing substances is positioned by causing the liquid to flow above the first electrode.

8. A method according to claim 6, wherein the liquid containing substances is positioned by causing the liquid to flow below the first electrode.

9. A method according to claim 1, wherein the liquid containing substances is positioned below the vacant space of the first electrode.

10. A method according to claim 1, wherein the substances are collected above the position of the vacant space.

11. A method according to claim 1, wherein the substances are collected below the position of the vacant space.

12. A method of detecting substances comprising positioning liquid containing substances in the vicinity of a first electrode having a vacant space therein and a second electrode, said vacant space substantially surrounded by said first electrode such that the periphery of the vacant space is not defined in part or at all by the second electrode, subjecting said liquid containing substances to influence by a negative dielectrophoretic force generated by application of voltage to said first electrode, collecting said substances subjected to influence by a negative dielectrophoretic force in the vicinity of said vacant space of said first electrode, and optically detecting said substance.

13. The method according to claim 12 wherein said substances subjected to influence by said negative dielectrophoretic force is a complex of a substance binding to a substance to be measured, a substance subjected to influence by a negative dielectrophoretic force and the substance to be measured which binds to said substance binding to a substance to be measured.

14. The method according to claim 13 wherein said substance subjected to influence by a negative dielectrophoretic force is a granular substance subjected to influence by a negative dielectrophoretic force.

15. A method according to claim 12, wherein the liquid containing substances is positioned above the vacant space of the first electrode.

16. A method according to claim 12, wherein the liquid containing substances is positioned by causing the liquid to flow about the first electrode.

17. A method according to claim 16, wherein the liquid containing substances is positioned by causing the liquid to flow above the first electrode.

18. A method according to claim 16, wherein the liquid containing substances is positioned by causing the liquid to flow below the first electrode.

19. A method according to claim 12, wherein the liquid containing substances is positioned below the vacant space of the first electrode.

20. A method according to claim 12, wherein the substances are collected above the position of the vacant space.

21. A method according to claim 12, wherein the substances are collected below the position of the vacant space.

* * * * *